Patented Jan. 1, 1924.

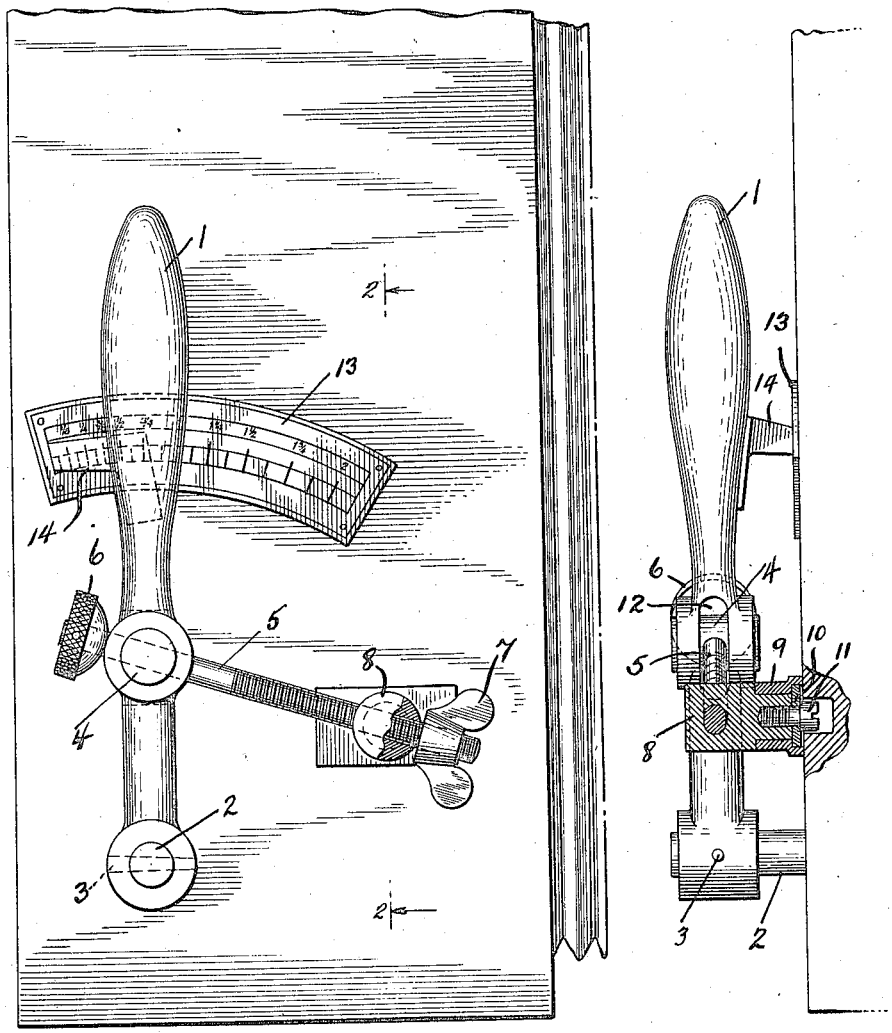

1,479,108

UNITED STATES PATENT OFFICE.

HENRY RENKEN, OF NEW YORK, N. Y., ASSIGNOR TO F. WESEL MANUFACTURING COMPANY, OF BROOKLYN, NEW YORK, A CORPORATION OF NEW YORK.

ADJUSTING DEVICE.

Application filed July 5, 1922. Serial No. 573,006.

*To all whom it may concern:*

Be it known that I, HENRY RENKEN, a citizen of the United States, and a resident of the county of Queens, in the city and State of New York, have invented certain new and useful Improvements in Adjusting Devices, of which the following is a specification.

My invention relates to adjusting devices and is more particularly directed to devices for adjusting the screen mechanism of photoengraver's cameras.

One of the objects of my invention is the provision of an adjusting device which may be easily and conveniently operated and which at all times will be out of the way of the operator when replacing plate holders on the camera.

Another object of my invention is the provision of an adjusting device whereby the screen mechanism may be thrown back and returned to the same position without causing any disturbance of the adjustment when once found.

Further objects of my invention will be manifest from the following description of the accompanying drawings in which—

Fig. 1 is an elevational view of my adjusting device and

Fig. 2 is a view taken on line 2—2 of Fig. 1.

Referring to the drawing in detail 1 designates a handle rigidly secured to a rotatable shaft 2 by means of a pin 3. The shaft 2 projects into the interior of the camera and by means of levers (not shown) is connected to the screen mechanism of the camera for the purpose of moving the same backward and forward while replacing plate holders on the camera.

The handle 1 is provided with a pin 4 which is rotatable therein and which functions as a bearing for the rod 5 said pin being provided with a transverse hole or opening to receive said rod.

The rod 5 is provided at one end with a knurled knob 6 which is rigidly secured thereto, and is partially threaded at its other end to receive a wing nut 7. A threaded bearing is provided for this end of the rod and comprises a rotatable bearing member 8 which is held to the side of the camera by means of the sleeve 9, washer 10 and screw 11.

A longitudinal slot 12 is provided in the handle 1 to permit oscillatory movement of the rod 5 therein when the handle is moved backward and forward.

A graduated dial 13 is provided on the side of the camera and a cooperating pointer or indicator 14 is provided on the handle 1 to indicate the desired adjustment.

When the screen mechanism is to be adjusted it is moved to the desired position by turning the knob 6 thereby advancing the handle 1 which in turn rotates the rod 2, which rod is connected to the screen mechanism. The pointer 14 is also moved at this time along the dial 13. When the desired adjustment has been found the wing nut 7 is screwed up in place until it engages the member 8 so as to prevent accidental movement of the adjusting mechanism.

Now with the adjusting mechanism set at a desired point it will be obvious that because of the rod 5 being capable of movement freely in the cylindrical pin 4 the handle 1 may be thrown backward, that is to the right as shown in Fig. 1 to any desired position so as to withdraw the screen mechanism from engagement with the plate holder of the camera or the removal of the same without disturbing the adjustment and it will be obvious that the handle may be brought forward again and the forward movement thereof will be limited by the knob 6 at the end of the rod 5 so that the screen mechanism will be brought back to its exact original position.

It will be understood that while I have described my invention for use in connection with cameras, I do not wish to be limited to such use, as the uses to which my device may be put are numerous, nor do I wish to be limited to the precise construction as illustrated and described inasmuch as the same may be varied without departing from the spirit and scope of my invention.

What I claim is:

1. In a screen adjusting device for cameras a handle provided with a slot, a rotatable adjusting rod extending through and freely movable in said slot, said handle being movable relatively to said rod and limited in its movement thereby.

2. In a device of the class described, a handle, an adjustable rod for limiting the movement of said handle, rotatable bearings for said rod, one of said bearings being attached to said handle, and said rod extending through both bearings at all times.

3. In a device of the class described, a handle, a rod for limiting the movement of said handle, a rotatable bearing for said rod, said rod being threaded at one end and that received by a threaded opening in said bearing, and a rotatable support attached to said handle, the other end of said rod passing through and being supported by said rotatable support.

4. In a device of the class described a handle, a pin supported by said handle, a shaft, a rod freely supported in an opening in said shaft, a rotatable bearing for the other end of said rod, said handle being provided with a slot through which the rod passes to permit oscillatory movement of said rod.

5. In a device for adjusting the screen mechanism of cameras the combination of an adjusting rod, a rotatable bearing for one end of said rod, a stop on the other end of said rod, a handle attached to the screen mechanism to be adjusted, a pointer on said handle, a dial on the wall of the camera cooperating with said pointer, and a rotatable support in said handle for the stop end of said rod, said rod being slidable relatively to said rotatable support.

This specification signed this 15th day of June, 1922.

HENRY RENKEN.